(12) United States Patent  
Chen et al.

(10) Patent No.: US 7,811,725 B2
(45) Date of Patent: Oct. 12, 2010

(54) COLOR FILTER SUBSTRATE

(75) Inventors: Chien-Chung Chen, Tai Chung (TW); Chin-Pei Hwang, Tai Chung (TW)

(73) Assignee: Wintek Corporation, Taichung (TW)

( * ) Notice: Subject to any disclaimer, the term of this patent is extended or adjusted under 35 U.S.C. 154(b) by 905 days.

(21) Appl. No.: 11/707,916

(22) Filed: Feb. 20, 2007

(65) Prior Publication Data

US 2007/0217045 A1 Sep. 20, 2007

(30) Foreign Application Priority Data

Mar. 16, 2006 (TW) .............................. 95108896 A (51) Int. Cl.
*G02B 5/20* (2006.01)
(52) U.S. Cl. ..................... 430/7; 359/589; 359/590; 359/891
(58) Field of Classification Search ............ None
See application file for complete search history.

(56) References Cited

U.S. PATENT DOCUMENTS

| | | |
|---|---|---|
| 4,366,307 A | 12/1982 | Singh et al. |
| 4,979,803 A * | 12/1990 | McGuckin et al. ......... 359/890 |
| 5,168,383 A | 12/1992 | Iwaki et al. |
| 5,528,295 A | 6/1996 | Wagner |
| 5,550,373 A | 8/1996 | Cole et al. |
| 6,768,555 B2 | 7/2004 | Chen et al. |

FOREIGN PATENT DOCUMENTS

| | | |
|---|---|---|
| CN | 1690737 | 11/2005 |
| WO | WO-95/17690 A1 | 6/1995 |

\* cited by examiner

*Primary Examiner*—John A. McPherson
(74) *Attorney, Agent, or Firm*—Muncy, Geissler, Olds, & Lowe, PLLC (57) ABSTRACT

A color filter substrate includes a transparent substrate, a first and second reflective layers, a spacer layer, and an interference layer. The spacer layer is interposed between the two reflective layers and includes a plurality of first, second and third regions that are distinguished from one another according to their respective thicknesses, where the first, second and third regions overlap red, green and blue pixel portions, respectively. An interference layer is formed on the second reflective layer at positions overlapping the red pixel portions.

16 Claims, 14 Drawing Sheets

(Prior Art)

# COLOR FILTER SUBSTRATE

BACKGROUND OF THE INVENTION (a) Field of the Invention

The invention relates to a color filter substrate, and more particularly to a color filter substrate using interference filters.

(b) Description of the Related Art

Figure 1:
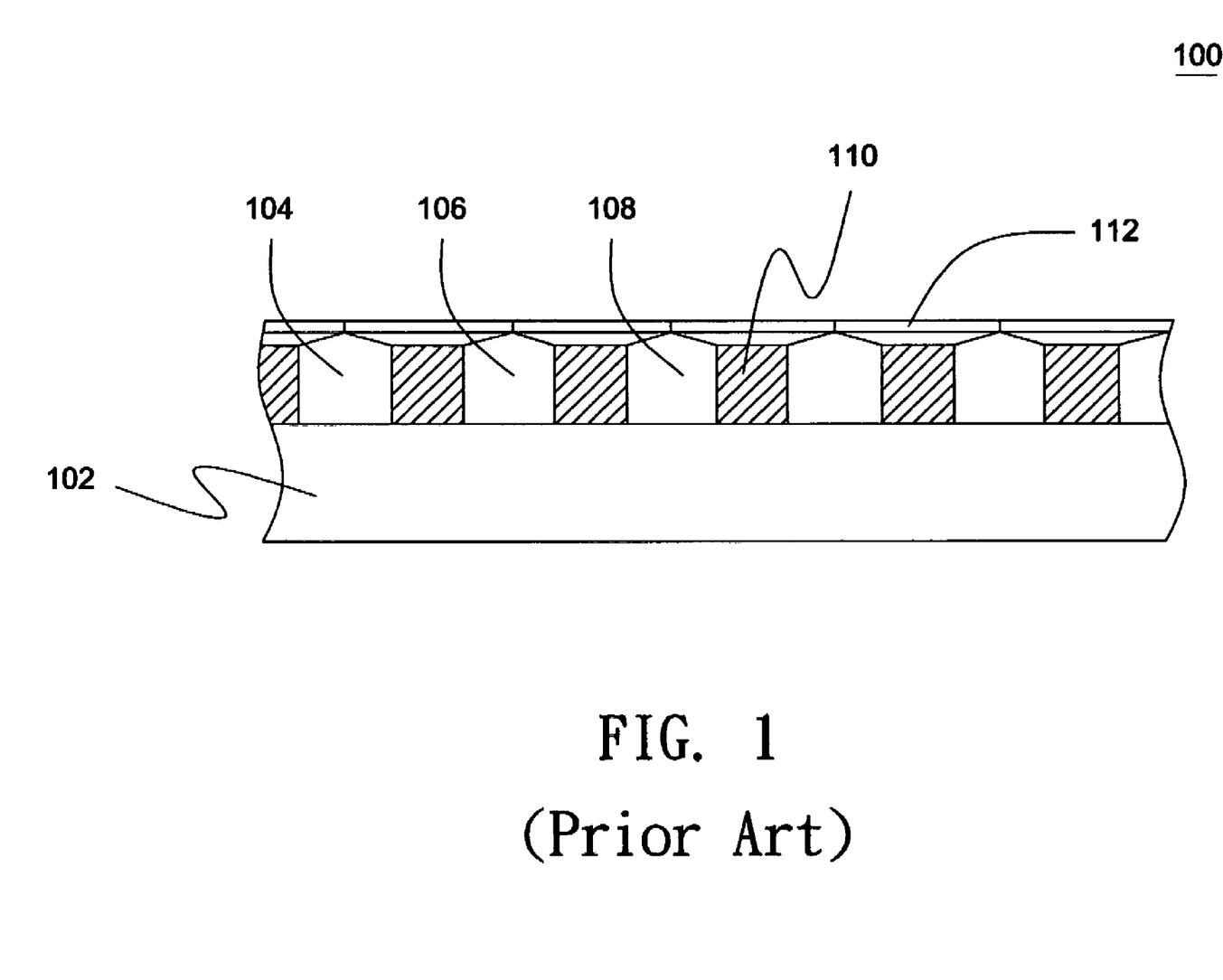
FIG. 1 shows a schematic diagram illustrating a conventional color filter substrate.

The color filter is a critical component for a color liquid crystal display (color LCD) since the former certainly determines the color performance of the latter. Further, the color filter often takes up a high percentage of the overall fabrication cost of a color LCD. FIG. 1 shows a schematic diagram illustrating a conventional color filter substrate 100. Referring to FIG. 1, a black matrix 110 is spread on a glass substrate 102 and defines a plurality of opening regions in which red, green and blue color filters 104, 106 and 108 are formed. The black matrix 110 is used to improve the display quality by blocking the stray light passing through the gap between the pixel electrodes (not shown) that correspond to different color filters. Also, a transparent electrode 112 is formed on the top of the black matrix 110 and the color filters 104, 106 and 108.

Figure 2:
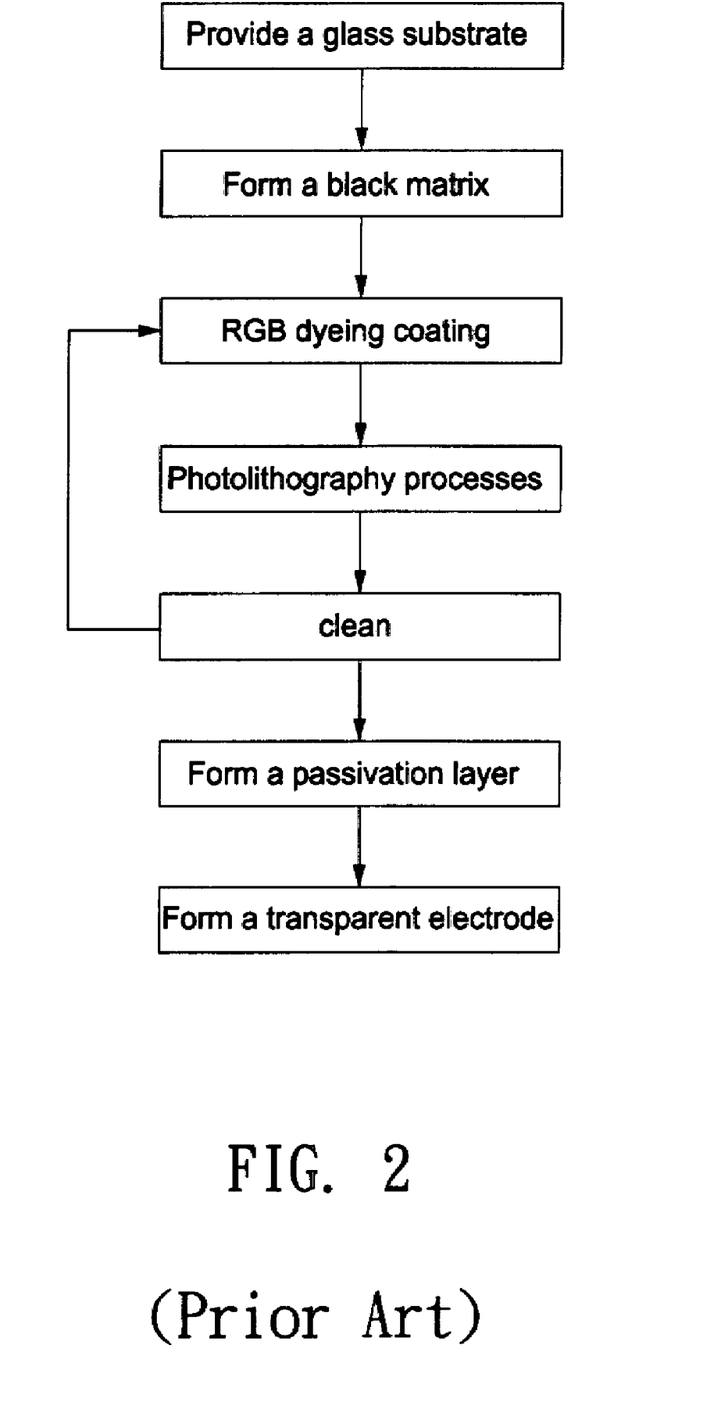
FIG. 2 shows a flow chart illustrating the steps of a pigment-dispersed method that is most widely used in the fabrication of a color filter substrate.

FIG. 2 shows a flow chart illustrating the steps of a pigment-dispersed method that is most widely used in the fabrication of a color filter substrate. The steps of the pigment-dispersed method are similar to typical semiconductor photolithography processes. First, a dyeing photosensitive material is applied to the surface of a glass substrate having black matrix through a spin coating process. Next, the dyeing photosensitive material such as a red photosensitive material is exposed through a mask and then developed on selected areas to form red pixel portions on the glass substrate. This procedure is repeated for green and blue dyeing photosensitive materials to form green and blue pixel portions. Finally, a passivation layer and a transparent electrode are sequentially formed on the colored coatings to complete the fabrication of the color filter substrate.

However, such fabrication method obviously has the following disadvantages. First, with regard to the fabrication process, its spin coating process through which the dyeing photosensitive material is coated on the glass substrate results in low utilization efficiency of raw materials and thus increases the fabrication cost. Further, as to the color performance, the red, green or blue light filtered out by the color filter substrate fabricated by the pigment-dispersed method has low spectrum resolution to result in an unsatisfactory color saturation of a color LCD.

BRIEF SUMMARY OF THE INVENTION

Hence, an object of the invention is to provide a color filter substrate capable of transmitting high-resolution spectra of red, green, and blue light to improve the color saturation of a color liquid crystal display.

According to the invention, a color filter substrate on which a plurality of red, green, and blue pixel portions are formed includes a transparent substrate, a first and second reflective layers, a spacer layer, and an interference layer. The first reflective layer is formed on the transparent substrate, and the spacer layer is formed on the first reflective layer. The spacer layer includes a plurality of first, second and third regions that are distinguished from one another according to their respective thicknesses, where the first, second and third regions overlap the red, green and blue pixel portions, respectively. The second reflective layer is substantially parallel to the first reflective layer and formed on the spacer layer, and an interference layer is formed on the second reflective layer at positions overlapping the red pixel portions. Also, according to the invention, in case a precise selection of the thickness of the spacer layer is made to obtain an acceptable chroma value of red color, the interference layer can be omitted.

Through the design of the invention, the two reflective layers with a spacer layer interposed between them constitute a single cavity Fabry-Perot filter, and the thickness of the spacer layer is adjusted to provide transmission of a particular color. Thus three Fabry-Perot filters having their respective cavity lengths may provide high-resolution spectra of red, green, and blue light to form red, green, and blue pixel portions of a color filter substrate. Also, an interference layer can be provided to further purify the output red light to result in optimal color saturation.

DETAILED DESCRIPTION OF THE INVENTION

Figure 3:
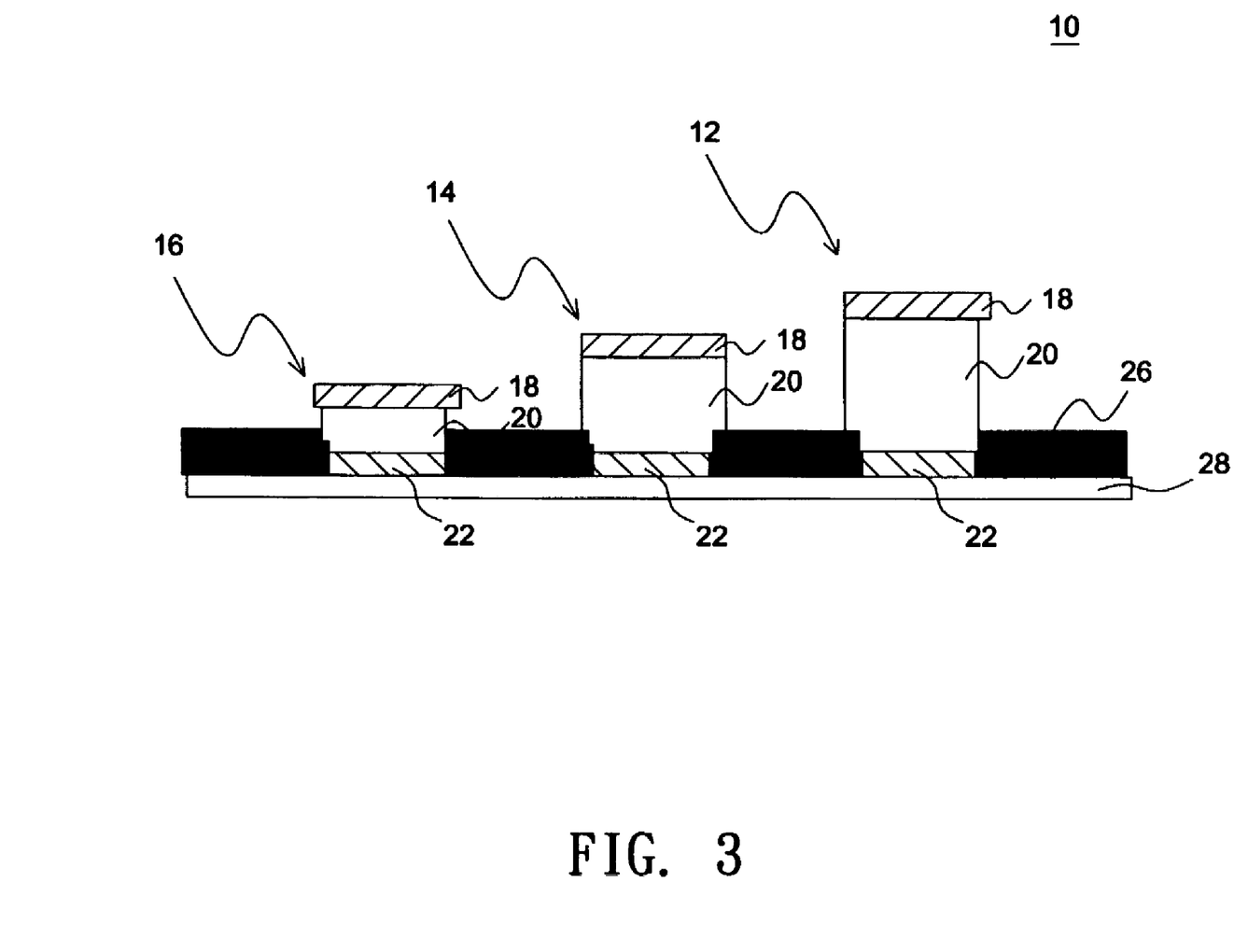
FIG. 3 shows a cross-sectional schematic diagram of a color filter substrate according to an embodiment of the invention.

FIG. 3 shows a cross-sectional schematic diagram of a color filter substrate 10 according to an embodiment of the invention. On the color filter substrate 10, a red pixel portion 12, a green pixel portion 14, and a blue pixel portion 16 are provided, and each two adjacent pixel portions are spaced apart by a black matrix 26 to prevent a mix of different colors.

Referring to FIG. 3, the black matrix 26 is spread on a glass substrate 28 and defines a plurality of opening regions. Each pixel portion of the color filter substrate 10 is provided in each opening region and formed by a triple-layer structure that consists of a first reflective layer 18, a second reflective layer 22 parallel to the first one, and a spacer layer 20 interposed between them. The first and second reflective layers 18 and 22 and the spacer layer 20 are formed on the transparent substrate 28 through a variety of vacuum deposition processes such as a thin film evaporation or sputtering process at a high degree of vacuum.

According to the invention, the two reflective layers 18 and 22 with a spacer layer 20 interposed between them constitute a single cavity Fabry-Perot filter. In the Fabry-Perot filter, resonance peaks with high resolution occur when the thickness of the spacer layer is an integer multiple of one half the wavelength of resonant frequency. Thus the thickness of the spacer layer 20 determines the output center wavelength of the single cavity Fabry-Perot filter. Hence, the thickness of the spacer layer 20 in a Fabry-Perot filter can be adjusted to provide transmission of a particular color, such as red, green or blue color, to form the red, green, and blue pixel portions 12, 14 and 16 of the color filter substrate 10. In other words, the spacer layer 20 formed on the first reflective layer 18 includes a plurality of first regions, second regions, and third regions that are distinguished from one another according to their respective thicknesses, and the first, the second and the third regions overlap the red, green and blue pixel portions 12, 14 and 16, respectively.

The transparent substrate 28 may be a glass substrate, a plastic sheet, or a plastic film. The reflective layers 18 and 22 are preferably made of silver or silver alloy. The spacer layer 20 may be made of dielectric films or conductive metal-oxide films. The dielectric films may be composed of $MgF_2$, $SiO_2$, $Al_2O_3$, $TiO_2$, $ZrO_2$, or $Nb_2O_5$ and preferably have a refractive index between 1.3 and 2.6. The conductive metal-oxide films may be composed of indium tin oxide (ITO), indium zinc oxide (IZO), or aluminum zinc oxide (AZO). The selection of materials and thicknesses for each stack in a color filter substrate are described in the following embodiments.

First Embodiment

TABLE 1

| Laminate | Material | Thickness |
| --- | --- | --- |
| Reflective layers | Ag | 40 nm |
| Spacer layer corresponding to red pixel portion | $SiO_2$ | 190 nm |
| Spacer layer corresponding to green pixel portion | $SiO_2$ | 139 nm |
| Spacer layer corresponding to blue pixel portion | $SiO_2$ | 92 nm |
| Interference layer | Si | 42 nm |

In this embodiment, the first and second reflective layers 18 and 22 are both made of silver (Ag) and have a thickness of 40 nm. The spacer layer 20 is made of silicon dioxide ($SiO_2$) having a low refractive index.

Figure 4A:
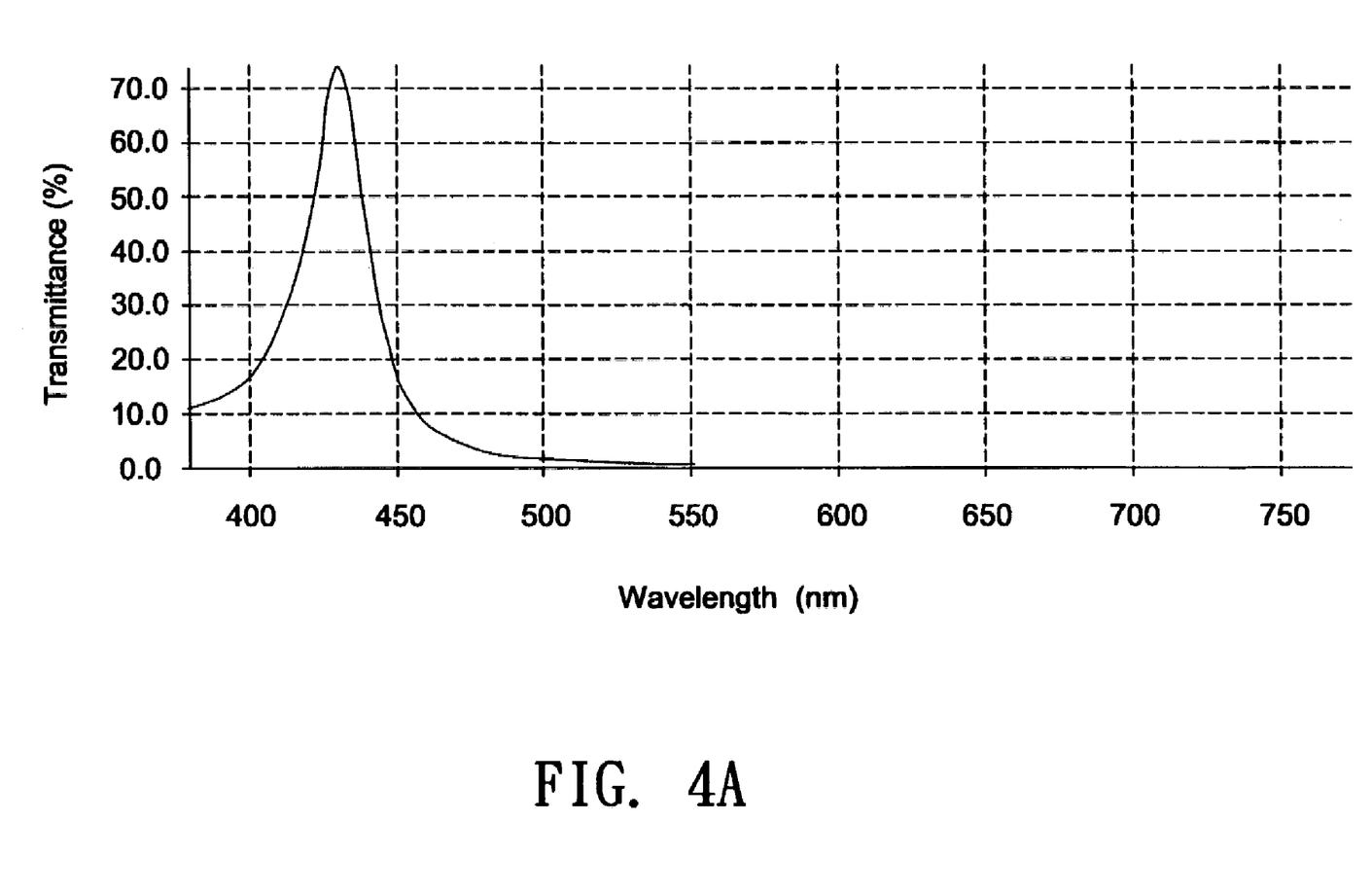
FIGS. 4A-4D show the transmittance of a particular color versus the wavelength of light according to a first embodiment of the invention.
Figure 4B:
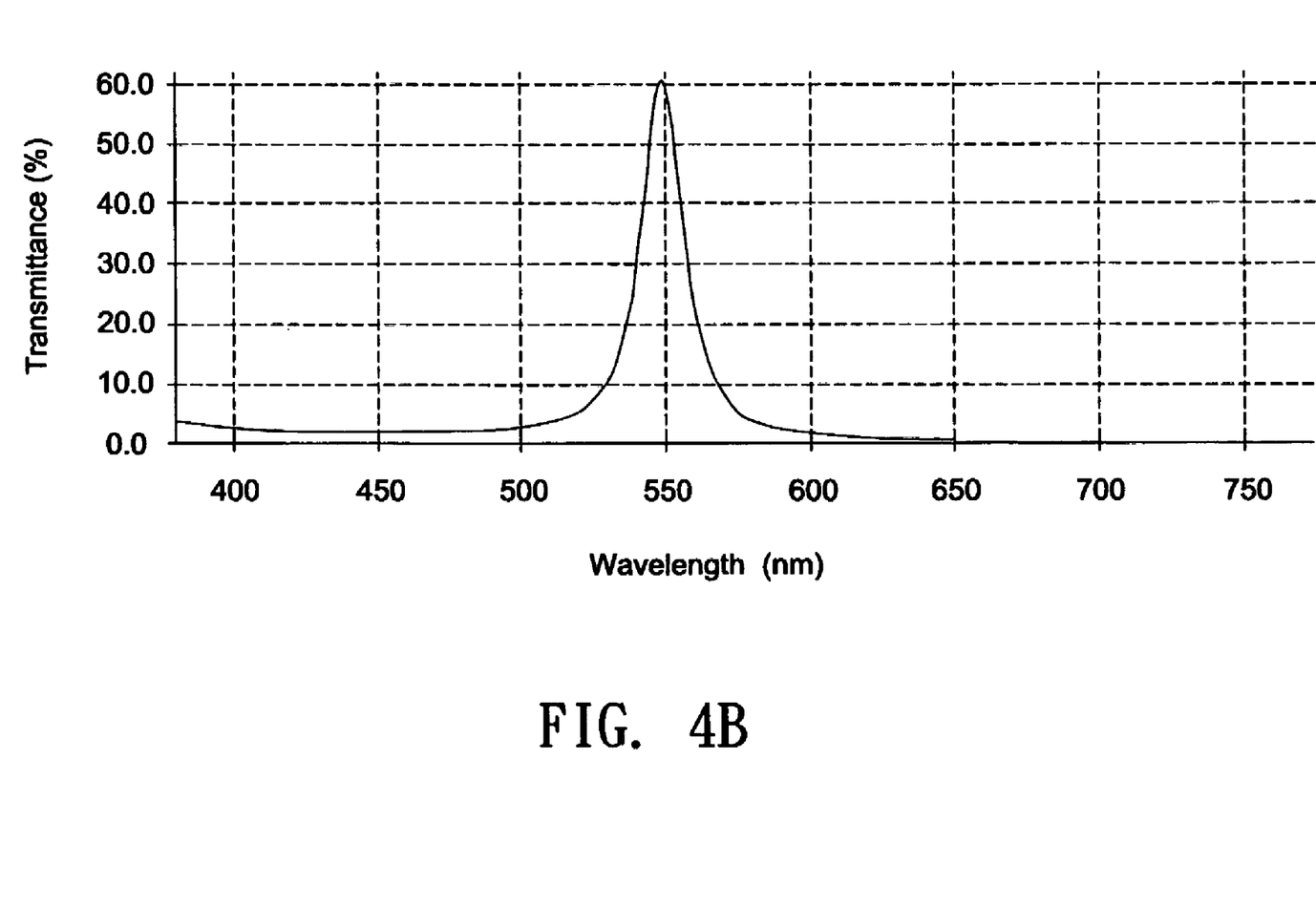
Figure 4C:
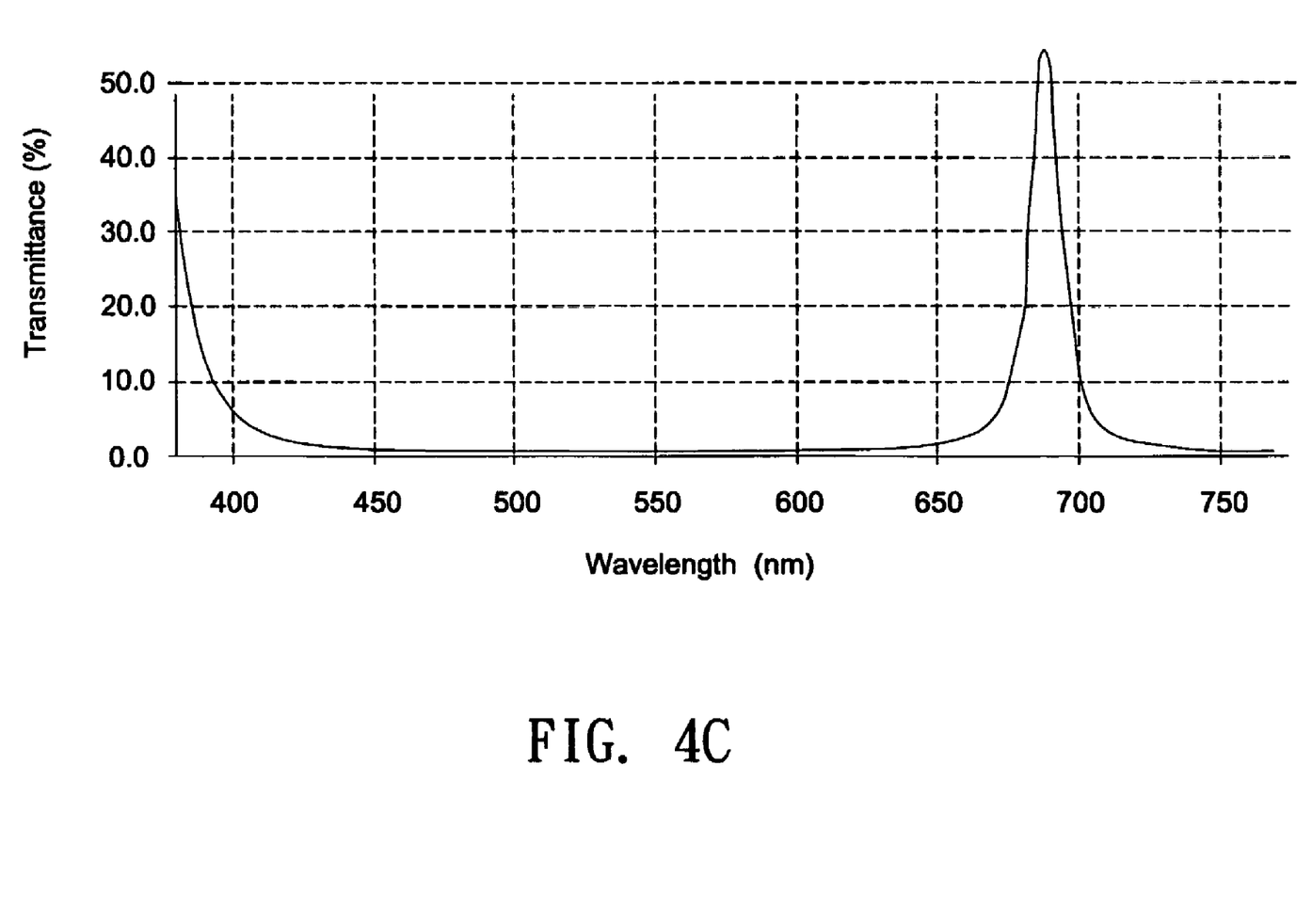

FIGS. 4A-4D show the transmittance of a particular color versus the wavelength of light according to the selection listed in table 1. Referring to FIGS. 4A and 4B, it can be seen the blue pixel portion 16 and the green pixel portion 14 may output pure blue light and green light, respectively, under the selection of the spacer layer thickness listed in table 1. However, referring to FIG. 4C, as the thickness of the spacer layer 20 corresponding to the red pixel portion 12 is selected as 190 nm, an undesired peak emerging at a wavelength of about 380nm-400 nm of the output spectrum causes an output of purple light from the red pixel portion 12.

Figure 4D:
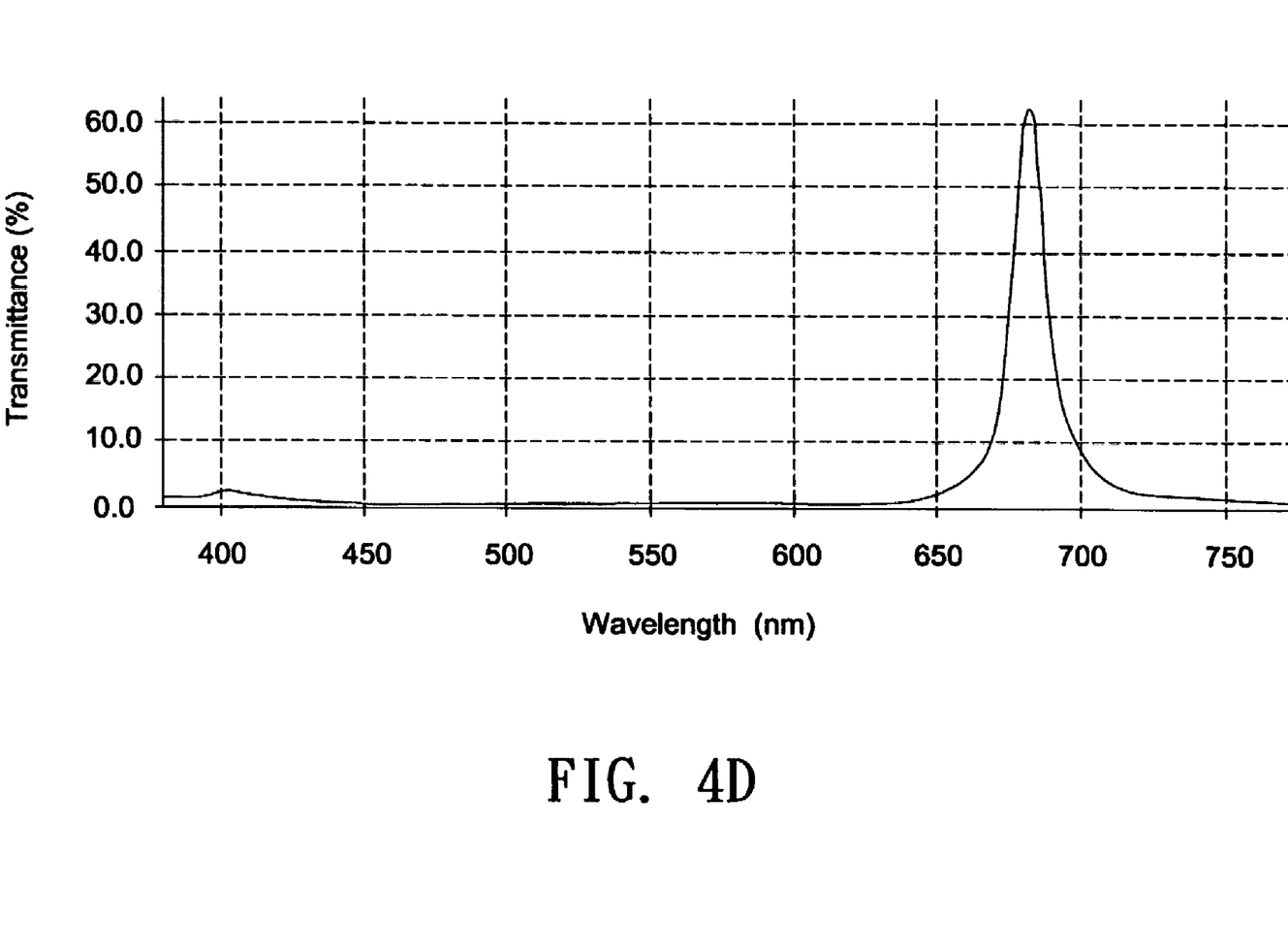
Figure 5:
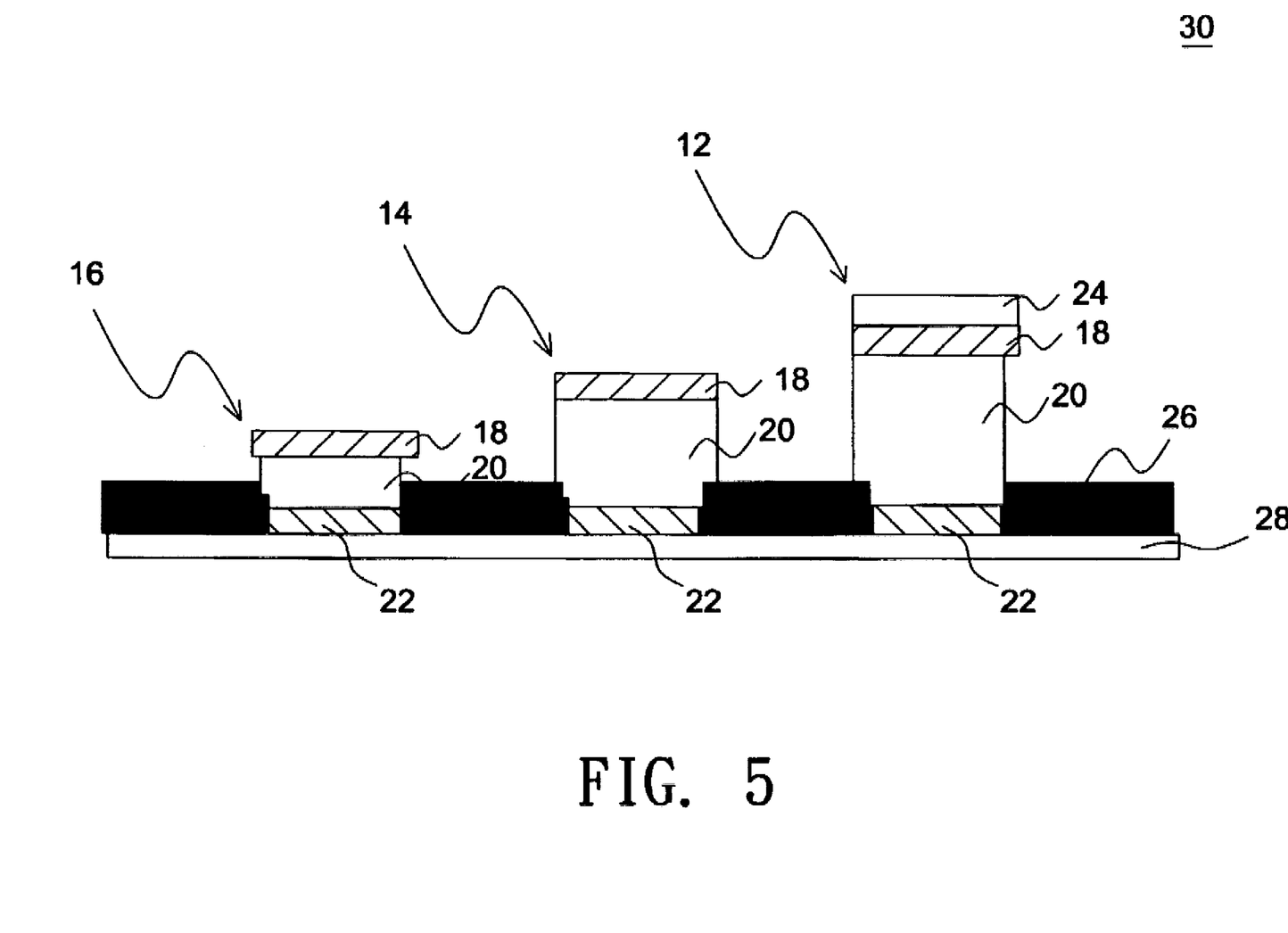
FIG. 5 shows a cross-sectional schematic diagram of a color filter substrate according to another embodiment of the invention.

Hence, as shown in FIG. 5, according to this embodiment, an interference layer 24 is provided on top of the first reflective layer 18 in a color filter substrate 30 to solve this problem. Through the use of an interference layer having a selected material and thickness (e.g., silicon films having a thickness of 42 nm in this embodiment), the undesired peak emerging at 380 nm-400 nm of the output spectrum is eliminated to result in an output of pure red light from the red pixel portion 12, as shown in FIG. 4D. Note that the interference layer 24 includes, but is not limited to, silicon (Si) films, and other dielectric films or conductive metal-oxide films may also be used instead. For example, the material of the interference layer may be $MgF_2$, $SiO_2$, $Al_2O_3$, $TiO_2$, $ZrO_2$, $Nb_2O_5$, ITO, IZO, or AZO.

Second Embodiment

TABLE 2

| Laminate | Material | Thickness |
| --- | --- | --- |
| Reflective layers | Ag | 40 nm |
| Spacer layer corresponding to red pixel portion | $TiO_2$ | 99 nm |
| Spacer layer corresponding to green pixel portion | $TiO_2$ | 68 nm |
| Spacer layer corresponding to blue pixel portion | $TiO_2$ | 40 nm |
| Interference layer | Si | 42 nm |

In this embodiment, the first and second reflective layers 18 and 22 are both made of silver (Ag) and have a thickness of 40 nm. The spacer layer 20 is made of titanium dioxide ($TiO_2$) having a high refractive index.

Figure 6A:
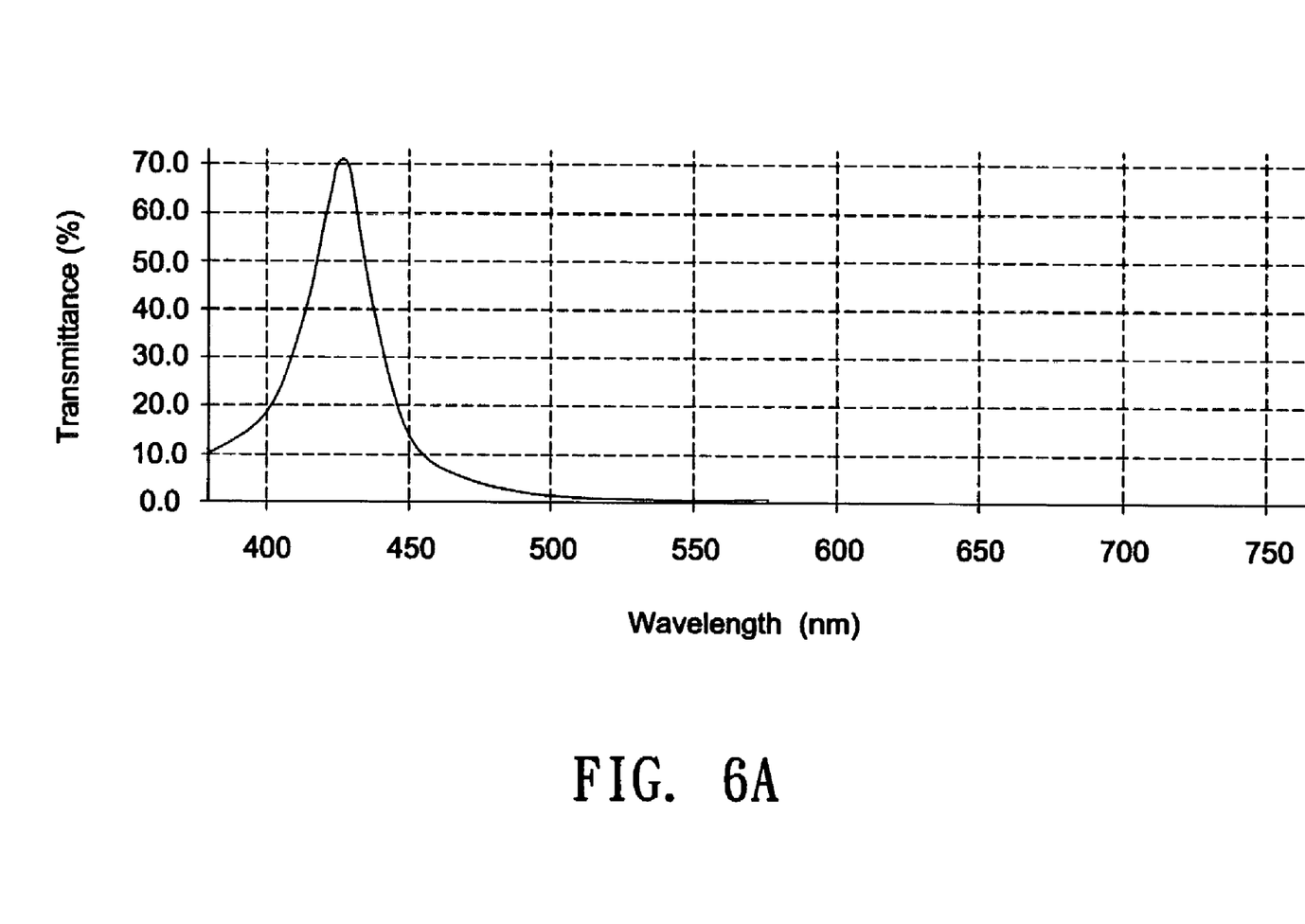
FIG. 6A-6D show the transmittance of a particular color versus the wavelength of light according to a second embodiment of the invention.
Figure 6B:
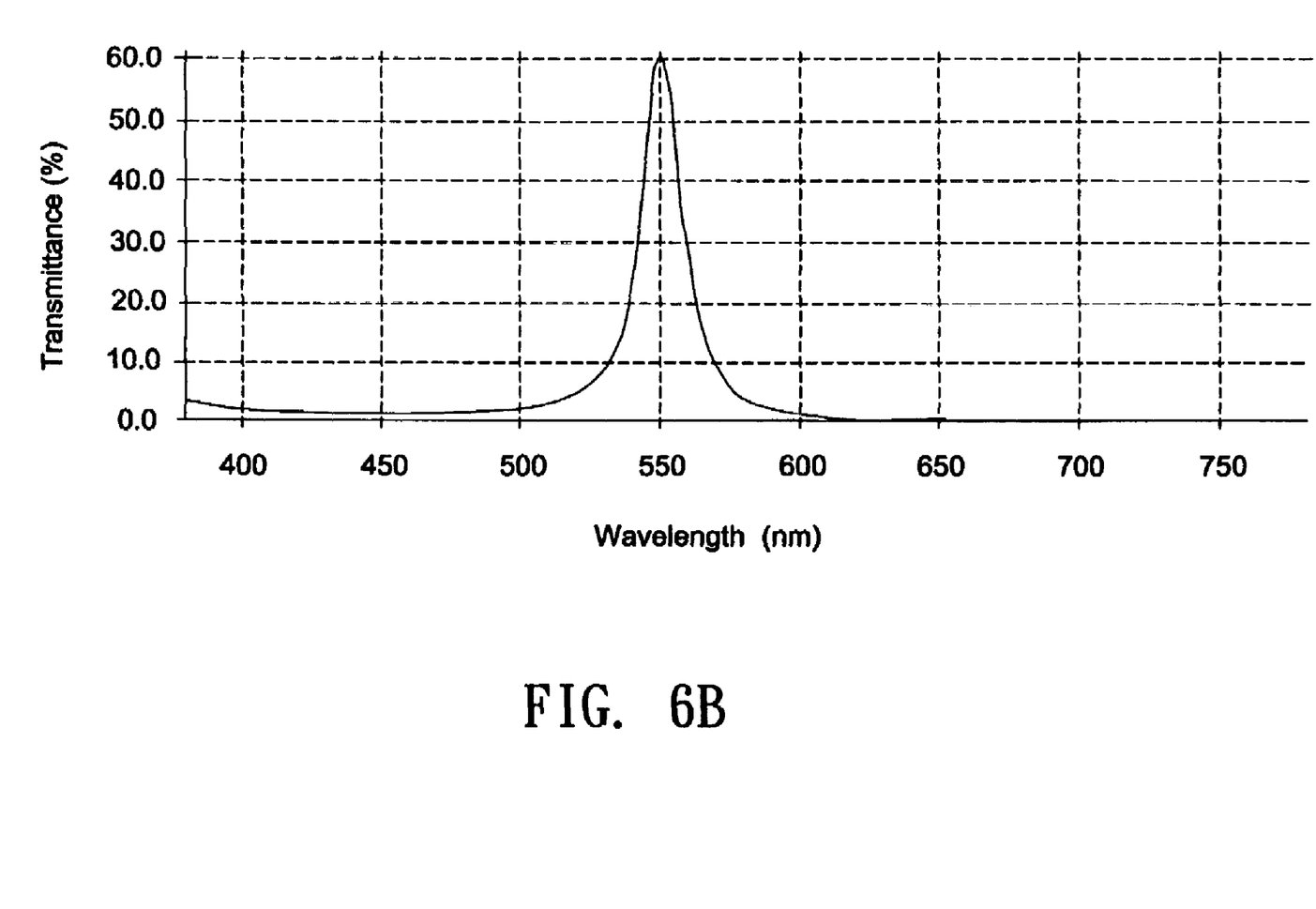
Figure 6C:
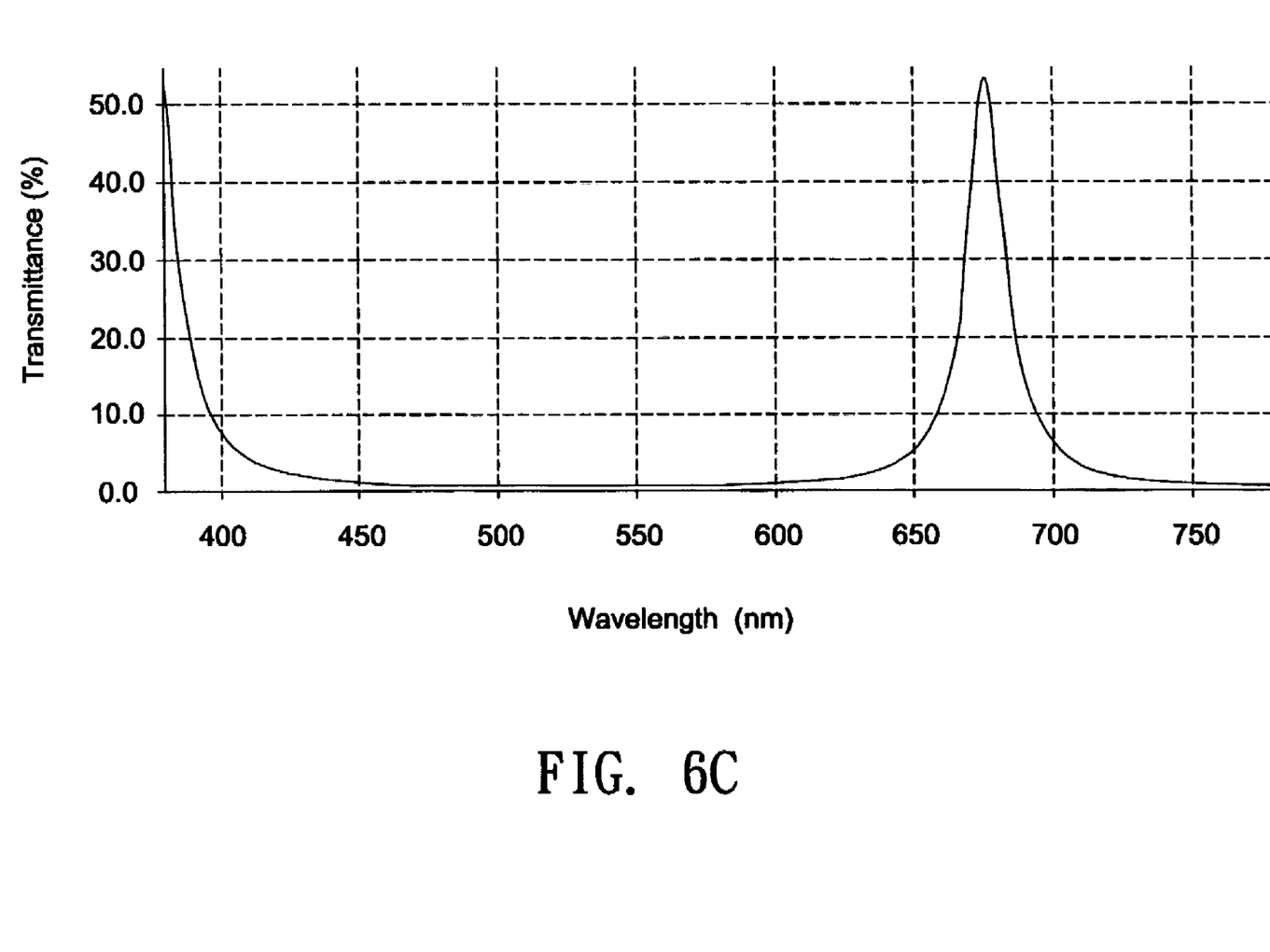

FIGS. 6A-6D show the transmittance of a particular color versus the wavelength of light according to the selection listed in table 2. Referring to FIGS. 6A and 6B, it can be seen the blue pixel portion 16 and the green pixel portion 14 may output pure blue light and green light, respectively, under the selection of the spacer layer thickness listed in table 2. However, referring to FIG. 6C, as the thickness of the spacer layer 20 corresponding to the red pixel portion 12 is selected as 99 nm, an undesired peak emerging at a wavelength of about 380 nm-400 nm of the output spectrum causes an output of pink light from the red pixel portion 12.

Figure 6D:
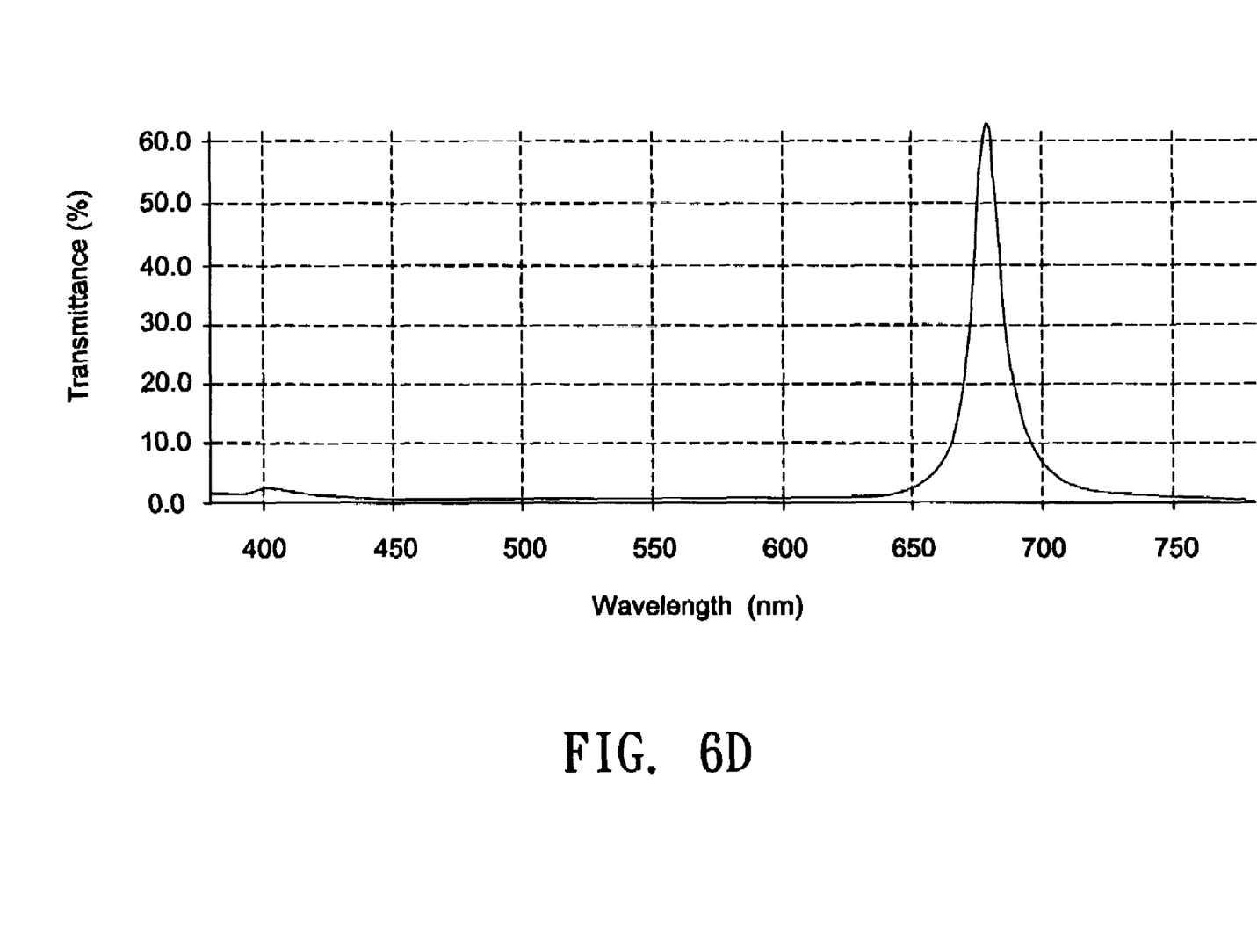

This problem is also cured by providing the interference layer 24 on top of the first reflective layer 18. Through the use of an interference layer having a selected material and thickness (e.g., silicon films having a thickness of 42 nm in this embodiment), the undesired peak emerging at 380 nm-400 nm of the output spectrum is eliminated to result in an output of pure red light from the red pixel portion 12, as shown in FIG. 6D.

From the above embodiments, since the interference layer 24 is provided to eliminate undesired peak, a more extensive range of thickness can be selected to still obtain pure transmission of red light. However, according to the invention, in case the thickness of the spacer layer 20 corresponding to the red pixel portion 12 is precisely selected, its possible to obtain an acceptable chroma value of the output red light without providing the interference layer 24. The following embodiments exemplify a color filter substrate (shown in FIG. 3) capable of outputting red light with an acceptable chroma value without the formation of the interference layer 24.

Third Embodiment

TABLE 3

| Laminate | Material | Thickness |
| --- | --- | --- |
| Reflective layers | Ag | 40 nm |
| Spacer layer corresponding to red pixel portion | $SiO_2$ | 180.5 nm |
| Spacer layer corresponding to green pixel portion | $SiO_2$ | 139 nm |
| Spacer layer corresponding to blue pixel portion | $SiO_2$ | 92 nm |

Figure 7:
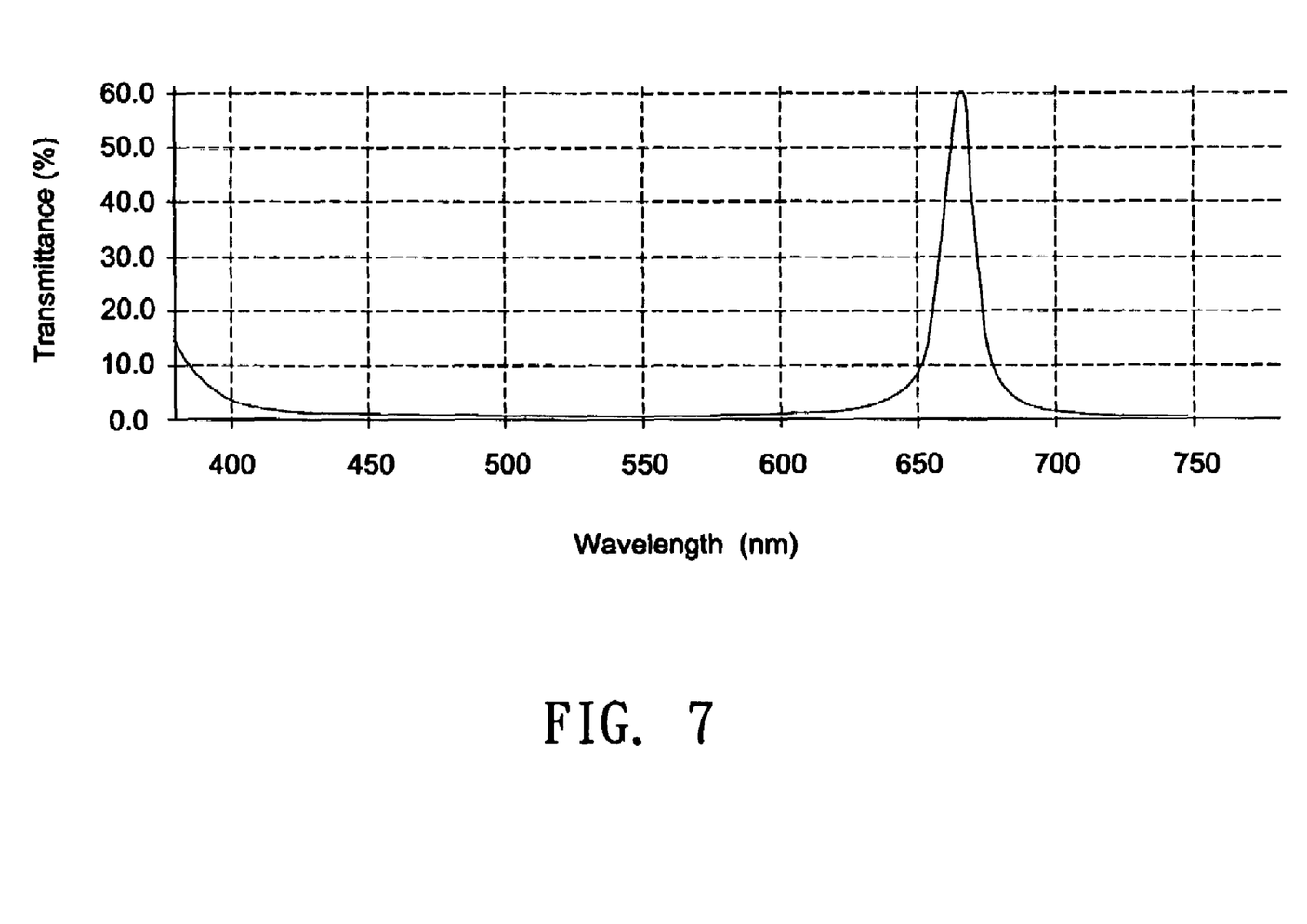
FIG. 7 shows the spectral characteristics of the output red light according to a third embodiment of the invention.

In this embodiment, the first and second reflective layers 18 and 22 are both made of silver (Ag) and have a thickness of 40 nm. The spacer layer 20 is made of silicon dioxide ($SiO_2$) having a low refractive index. FIG. 7 shows the spectral characteristics of the output red light from the red pixel portion 12 when the thickness of the spacer layer 20 corresponding to the red pixel portion 12 is selected as 180.5 nm. As shown in FIG. 7, though an undesired peak also emerges at a wavelength of about 380 nm-400 nm of the output spectrum, it is comparatively small when compared with the undesired peaks shown in the first and second embodiments. From this embodiment, the chromaticity coordinate in a CIE 1931 chromaticity diagram (X,Y)=(0.529, 0.264), and this is an acceptable chroma value of red color. Thus the interference layer 24 can be omitted through a careful selection of the thickness of the spacer layer 20.

Forth Embodiment

TABLE 4

| Laminate | Material | Thickness |
| --- | --- | --- |
| Reflective layers | Ag | 40 nm |
| Spacer layer corresponding to red pixel portion | $TiO_2$ | 92.5 nm |
| Spacer layer corresponding to green pixel portion | $TiO_2$ | 68 nm |
| Spacer layer corresponding to blue pixel portion | $TiO_2$ | 40 nm |

Figure 8:
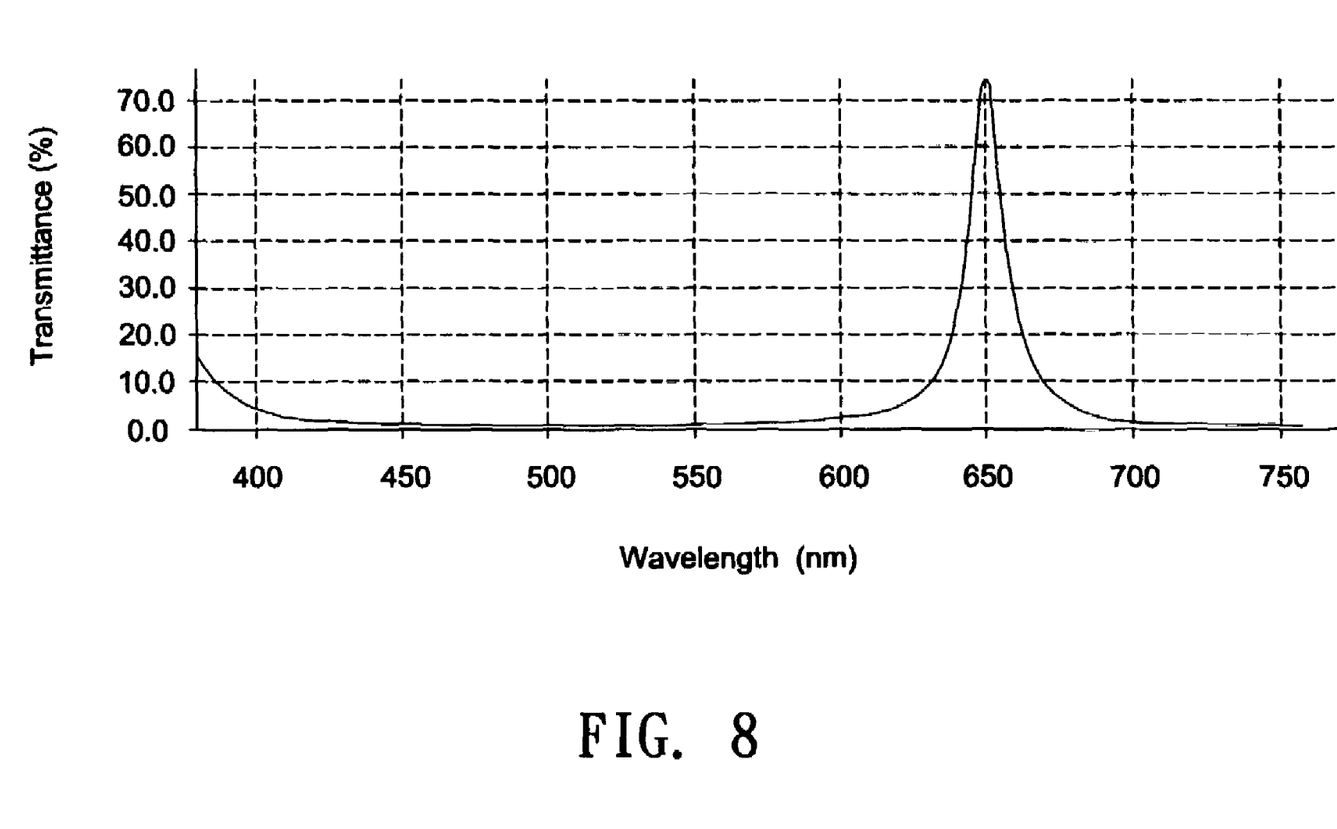
FIG. 8 shows the spectral characteristics of the output red light according to a fourth embodiment of the invention.

In this embodiment, the first and second reflective layers 18 and 22 are both made of silver (Ag) and have a thickness of 40 nm. The spacer layer 20 is made of titanium dioxide (TiO2) having a high refractive index. FIG. 8 shows the spectral characteristics of the output red light from the red pixel portion 12 when the thickness of the spacer layer 20 corresponding to the red pixel portion 12 is selected as 92.5 nm. As shown in FIG. 8, though an undesired peak also emerges at a wavelength of about 380 nm-400 nm of the output spectrum, it is comparatively small when compared with the undesired peaks shown in the first and second embodiments. From this embodiment, the chromaticity coordinate in a CIE 1931 chromaticity diagram (X,Y)=(0.603, 0.29), and this is an acceptable chroma value of red color. Thus the interference layer 24 can be omitted through a careful selection of the thickness of the spacer layer 20.

Through the design of the invention, the two reflective layers 18 and 22 with spacer layer 20 interposed between them constitute a single cavity Fabry-Perot filter, and the thickness of the spacer layer 20 is adjusted to provide transmission of a particular color. Thus three Fabry-Perot filters having their respective cavity lengths may provide high-resolution spectra of red, green, and blue light to form red, green, and blue pixel portions of a color filter substrate. Also, an interference layer 24 can be provided to further purify the output red light to result in optimal color saturation.

Moreover, according to the invention, the thickness of the reflective layer 18 or the reflective layer 22 is preferably between 5 nm and 60 nm. The thickness of the interference layer 24 is between 5 nm and 900 nm, preferably between 5 nm and 100 nm to obtain more pure red transmission. Also, the thickness of the spacer layer 20 is preferably between 10 nm and 900 nm. More specifically, in case the spacer layer 20 is made of silicon dioxide ($SiO_2$), the thickness of the spacer layer 20 corresponding to the red pixel portion 12 is preferably between 150 nm and 190 nm, between 120 nm and 142 nm for the green pixel portion 14, and between 10 nm and 120 nm for the blue pixel portion 16. In comparison, in case the spacer layer 20 is made of titanium dioxide (TiO2), the thickness of the spacer layer 20 corresponding to the red pixel portion 12 is preferably between 80 nm and 103 nm, between 55 nm and 70 nm for the green pixel portion 14, and between 10 nm and 55 nm for the blue pixel portion 16.

While the invention has been described by way of examples and in terms of the preferred embodiments, it is to be understood that the invention is not limited to the disclosed embodiments. On the contrary, it is intended to cover various modifications and similar arrangements as would be apparent to those skilled in the art. For instance, the invention is not limited to be used in a liquid crystal display (LCD), and other display device such as an organic light-emitting diode (OLED) display, a plasma display panel (PDP), a surface-conduction electron-emitter display (SED), a field emission display (FED), or a vacuum fluorescent display (VFD) may incorporate the invented color filter substrate. Further, in case the invention is utilized in an LCD, it is suitable for all types of liquid crystal displays, such as a transmissive type, a reflective type, and a transflective type LCD. Therefore, the scope of the appended claims should be accorded the broadest interpretation so as to encompass all such modifications and similar arrangements.

What is claimed is:

1. A color filter substrate on which a plurality of red, green, and blue pixel portions are formed, comprising:
   a transparent substrate;
   a first reflective layer formed on the transparent substrate;
   a spacer layer formed on the first reflective layer and comprising a plurality of first regions, second regions, and third regions that are distinguished from one another according to their respective thicknesses, wherein the first, second and third regions overlap the red, green and blue pixel portions, respectively;
   a second reflective layer substantially parallel to the first reflective layer formed on the spacer layer; and
   an interference layer formed on the second reflective layer at positions overlapping the red pixel portions.

2. The color filter substrate as claimed in claim 1, wherein the first and second reflective layers are made of silver or silver alloy.

3. The color filter substrate as claimed in claim 1, wherein the first and second reflective layers both have a thickness between 5 nm and 60 nm.

4. The color filter substrate as claimed in claim 1, wherein the spacer layer has a thickness between 10 nm and 900 nm.

5. The color filter substrate as claimed in claim 1, wherein the spacer layer is made of dielectric films.

6. The color filter substrate as claimed in claim 5, wherein the dielectric films is selected from the group consisting of $MgF_2$, $SiO_2$, $Al_2O_3$, $TiO_2$, $ZrO_2$, and $Nb_2O_5$.

7. The color filter substrate as claimed in claim 1, wherein the spacer layer is made of $SiO_2$, the first region has a thickness between 150 nm and 190 nm, the second region has a thickness between 120 nm and 142 nm, and the third region has a thickness between 10 nm and 120 nm.

8. The color filter substrate as claimed in claim 1, wherein the spacer layer is made of $TiO_2$, the first region has a thickness between 80 nm and 103 nm, the second region has a thickness between 55 nm and 70 nm, and the third region has a thickness between 10 nm and 55 nm.

9. The color filter substrate as claimed in claim 1, wherein the spacer layer is made of conductive metal-oxide films.

10. The color filter substrate as claimed in claim 9, wherein the conductive metal-oxide films are made of indium tin oxide (ITO), indium zinc oxide (IZO), or aluminum zinc oxide (AZO).

11. The color filter substrate as claimed in claim 1, wherein the interference layer is made of dielectric films or conductive metal-oxide films.

12. The color filter substrate as claimed in claim 1, wherein the material of the interference layer is selected from the group consisting of Si, $MgF_2$, $SiO_2$, $Al_2O_3$, $TiO_2$, $ZrO_2$, $Nb_2O_5$, ITO, IZO, and AZO.

13. The color filter substrate as claimed in claim 1, wherein the interference layer has a thickness of 5 nm-900 nm.

14. The color filter substrate as claimed in claim 1, wherein the transparent substrate is a glass substrate, a plastic sheet, or a plastic film.

15. A color filter substrate, comprising:

a transparent substrate;

a plurality of single cavity Fabry-Perot filters formed on the transparent substrate, the Fabry-Perot filters having different cavity lengths for transmitting red, green, and blue light; and an interference layer formed overlying the Fabry-Perot single cavity filters that transmit the red light.

16. The color filter substrate as claimed in claim 15, wherein each single cavity Fabry-Perot filter comprises two reflective layers arranged parallel to each other and a spacer layer interposed between them.

* * * * *